(12) United States Patent
Ohtake et al.

(10) Patent No.: US 8,605,386 B1
(45) Date of Patent: Dec. 10, 2013

(54) MAGNETIC RECORDING HEAD, HEAD GIMBAL ASSEMBLY WITH THE SAME, AND DISK DRIVE

(71) Applicants: Masaya Ohtake, Fujisawa (JP); Tomoko Taguchi, Kunitachi (JP)

(72) Inventors: Masaya Ohtake, Fujisawa (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/689,097

(22) Filed: Nov. 29, 2012

(30) Foreign Application Priority Data

Jul. 25, 2012 (JP) .................................. 2012-165067

(51) Int. Cl.
*G11B 5/31* (2006.01)
(52) U.S. Cl.
USPC .................................................. 360/119.02
(58) Field of Classification Search
USPC ............ 360/119.02, 119.06, 123.14, 125.29, 360/125.34; 29/603.07
See application file for complete search history.

(56) References Cited

U.S. PATENT DOCUMENTS

| 7,889,458 | B2 * | 2/2011 | Hsiao et al. | 360/125.3 |
| 2006/0002020 | A1 * | 1/2006 | Pokhil et al. | 360/126 |
| 2009/0116152 | A1 * | 5/2009 | Hsiao et al. | 360/314 |
| 2012/0262821 | A1 * | 10/2012 | Taguchi et al. | 360/99.08 |
| 2013/0063837 | A1 * | 3/2013 | Udo et al. | 360/75 |

FOREIGN PATENT DOCUMENTS

| JP | 07-282414 | 10/1995 |
| JP | 08-069609 | 3/1996 |
| JP | 2009-176399 | 8/2009 |

* cited by examiner

*Primary Examiner* — Angel Castro
(74) *Attorney, Agent, or Firm* — Patterson & Sheridan LLP

(57) ABSTRACT

According to one embodiment, a magnetic recording head in a magnetic disk drive with a recording medium includes a magnetic core including a plurality of magnetic poles which form a closed magnetic path, and a recording coil wound around a part of the magnetic core and produces a magnetic field to the magnetic core. The magnetic core includes a write gap formed of a nonmagnetic material in a disk-facing surface of the recording head, a magnetic gap portion located at a position off from the disk-facing surface and magnetically isolated, and a nonmagnetic material in the at least one magnetic gap portion. The recording coil is wound around the nonmagnetic material in the magnetic gap portion.

20 Claims, 8 Drawing Sheets

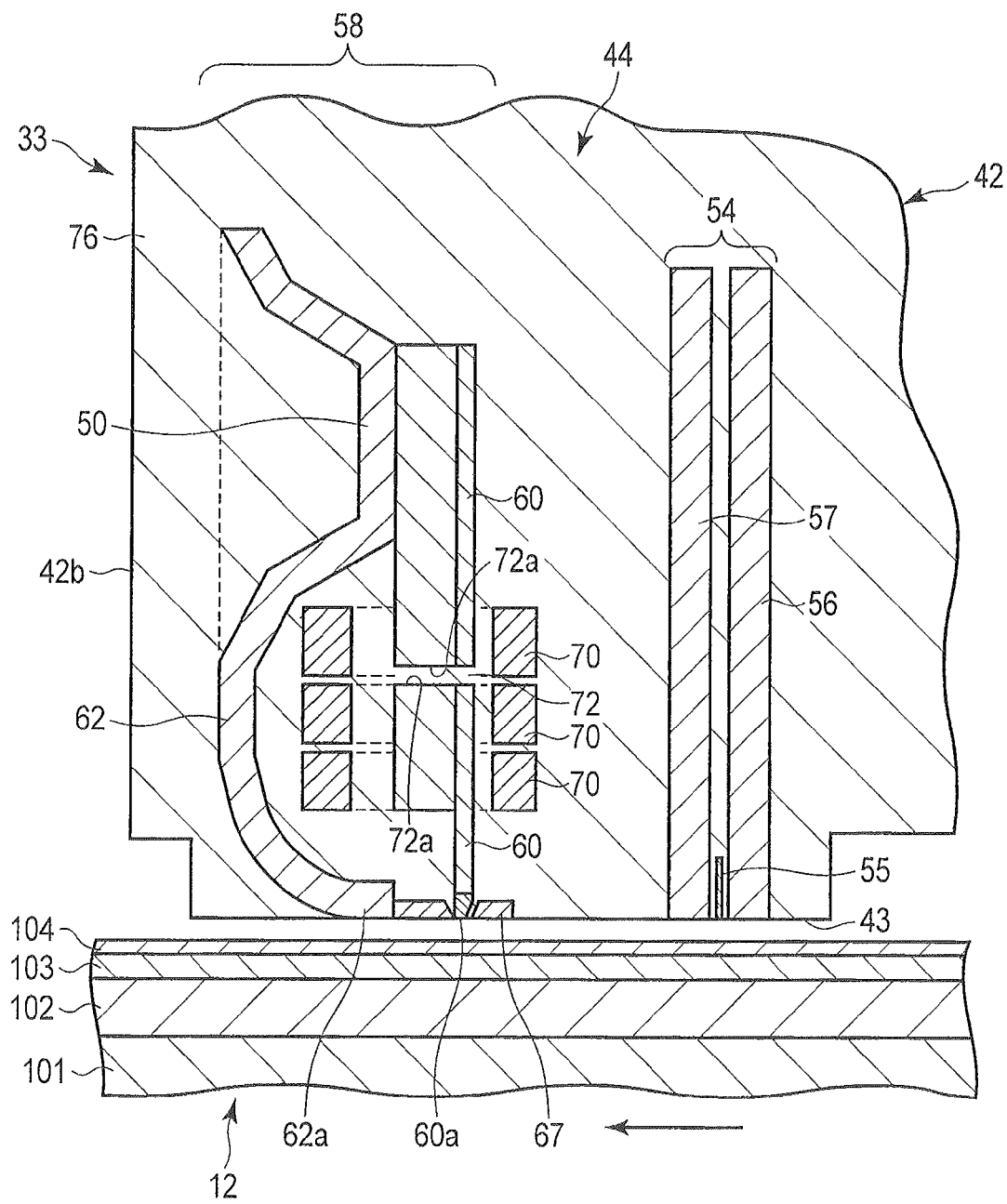
F I G. 3

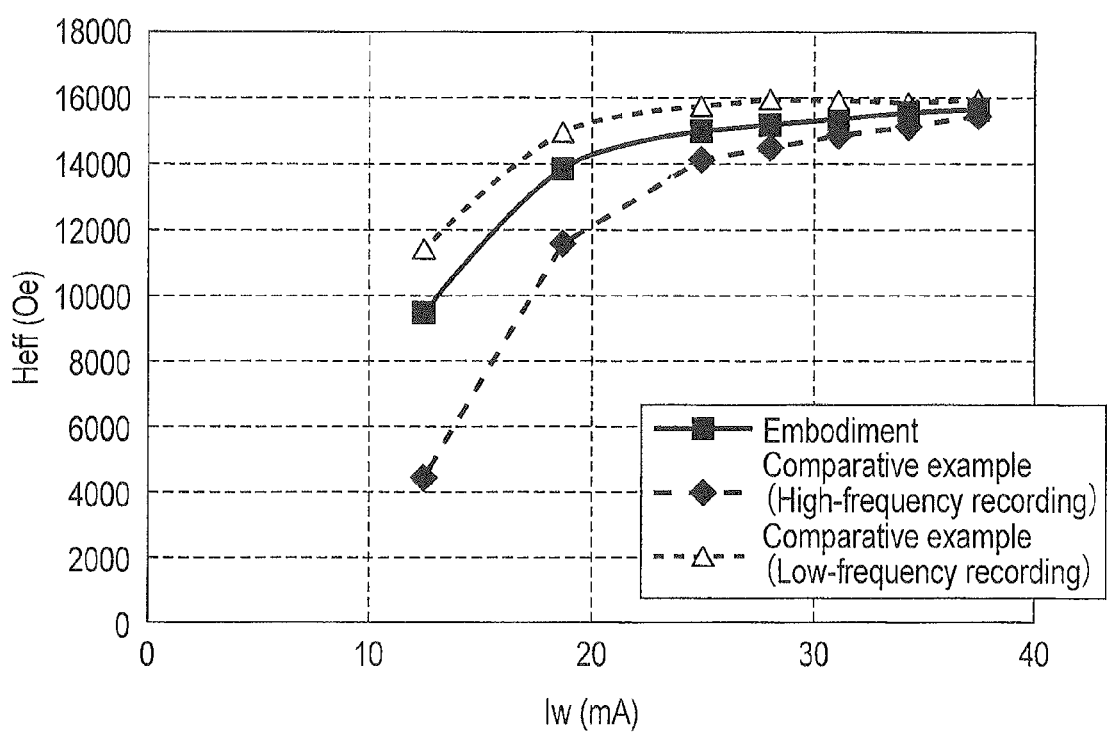
F I G. 5

MAGNETIC RECORDING HEAD, HEAD GIMBAL ASSEMBLY WITH THE SAME, AND DISK DRIVE

CROSS-REFERENCE TO RELATED APPLICATIONS

This application is based upon and claims the benefit of priority from Japanese Patent Application No. 2012-165067, filed Jul. 25, 2012, the entire contents of which are incorporated herein by reference.

FIELD

Embodiments described herein relate generally to a magnetic recording head used in a disk drive, a head gimbal assembly with the magnetic recording head, and the disk drive.

BACKGROUND

Magnetic heads for perpendicular magnetic recording have recently been proposed in order to increase the recording density and capacity of a magnetic disk drive or reduce its size. In one such magnetic head, a magnetic recording head comprises a main pole configured to produce a perpendicular magnetic field, trailing shield, and coil. The trailing shield is located opposite the main pole with a write gap therebetween and configured to close a magnetic path that leads to a magnetic disk. The coil serves to establish magnetic flux through the main pole. The coil is wound around a magnetic core that comprises the main pole and trailing shield.

In the magnetic recording head constructed in this manner, an alternating current is passed through the coil, whereupon a magnetic field produced by the coil changes the direction of magnetization in the magnetic core. Thus, recording on the magnetic disk can be performed with the magnetic field from the write gap in an air-bearing surface (ABS) of the magnetic head.

In the case of high-transfer-rate recording, however, the magnetization reversal response in the magnetic core cannot follow the reversal of the magnetic field created by the coil that is rapid.

Therefore, the timing of the next reversal is inevitably reached before the magnetization in the magnetic core is saturated. If the magnetization is not saturated, the strength of the magnetic field from the write gap of the magnetic core is reduced, so that the quality of signals recorded on the magnetic disk is degraded. Thus, it is difficult to improve the linear recording density.

BRIEF DESCRIPTION OF THE DRAWINGS

FIG. 3 is an enlarged sectional view showing a head section of the magnetic head and a magnetic disk;

FIG. 5 is a diagram comparatively showing relationships between input signal currents and generated magnetic field strengths of the magnetic recording head according to the embodiment and a magnetic recording head according to a comparative example;

DETAILED DESCRIPTION

Various embodiments will be described hereinafter with reference to the accompanying drawings. In general, according to one embodiment, a magnetic recording head in a magnetic disk drive, which comprises a double-layered perpendicular medium comprising a perpendicular recording layer, having a magnetic anisotropy perpendicular to a surface of a disk, and a soft magnetic layer with soft magnetic properties lying below the recording layer, the magnetic recording head comprises: a magnetic core comprising a plurality of magnetic poles which form a closed magnetic path; and a recording coil wound around a part of the magnetic core and configured to produce a magnetic field to the magnetic core. The magnetic core comprises a write gap formed of a nonmagnetic material in a disk-facing surface of the recording head, a magnetic gap portion located a position off from the disk-facing surface and magnetically isolated, and a nonmagnetic material in the magnetic gap portion. The recording coil is wound around the nonmagnetic material in the magnetic gap portion.

First Embodiment

Figure 1:
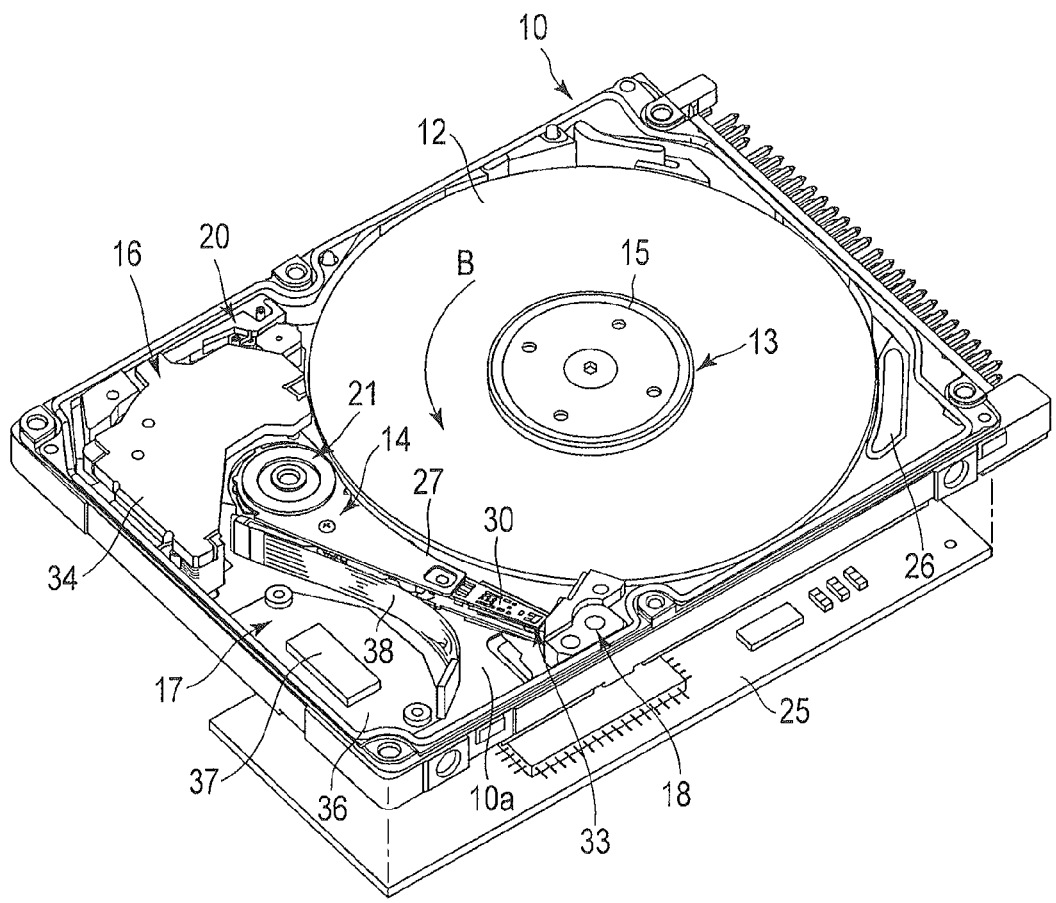
FIG. 1 is a perspective view showing a hard disk drive (HDD) according to a first embodiment.
Figure 2:
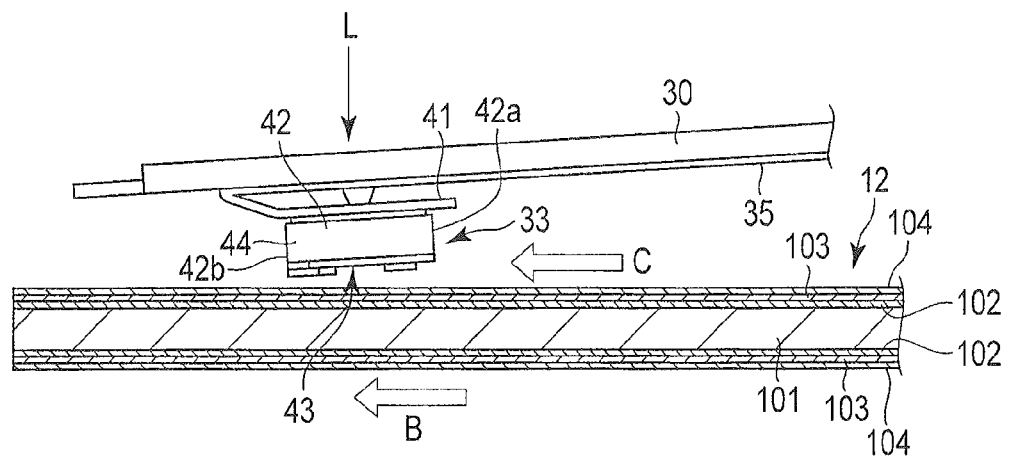
FIG. 2 is a side view showing a magnetic head and suspension of the HDD.

FIG. 1 shows the internal structure of an HDD according to a first embodiment with its top cover removed, and FIG. 2 shows a flying magnetic head. As shown in FIG. 1, the HDD comprises a housing 10. The housing 10 comprises a base 10a in the form of an open-topped rectangular box and the top cover (not shown) in the form of a rectangular plate. The top cover is attached to the base by screws so as to close the top opening of the base. Thus, the housing 10 is kept airtight inside and can communicate with the outside through a breathing filter 26 only.

The base 10a carries thereon a magnetic disk 12, for use as a recording medium, and a mechanical unit. The mechanical unit comprises a spindle motor 13, a plurality (for example, two) of magnetic heads 33, head actuator 14, and voice coil motor (VCM) 16. The spindle motor 13 supports and rotates the magnetic disk 12. The magnetic heads 33 record and reproduce data on and from the magnetic disk. The head actuator 14 supports the heads 33 for movement relative to the surface of the magnetic disk 12. The VCM 16 pivots and positions the head actuator. The base 10a further carries a ramp loading mechanism 18, latch mechanism 20, and board unit 17. The ramp loading mechanism 18 holds the magnetic heads 33 in positions off the magnetic disk 12 when the magnetic heads are moved to the outermost periphery of the disk. The latch mechanism 20 holds the head actuator 14 in a retracted position if the HDD is jolted, for example. Electronic components, such as a preamplifier, head IC, etc., are mounted on the board unit 17.

A printed circuit board 25 is attached to the outer surface of the base 10a by screws so as to face the bottom wall of the base. The circuit board 25 controls the operations of the spindle motor 13, VCM 16, and magnetic heads 33 through the board unit 17.

As shown in FIG. 1, the magnetic disk 12 is coaxially fitted on the hub of the spindle motor 13 and clamped and secured to the hub by a clamp spring 21, which is attached to the upper end of the hub by screws. The magnetic disk 12 is rotated at a predetermined speed in the direction of arrow B by the spindle motor 13.

The head actuator 14 comprises a bearing 21 secured to the bottom wall of the base 10a and a plurality of arms 27 extending from the bearing. The arms 27 are arranged parallel to the surfaces of the magnetic disk 12 and at predetermined intervals and extend in the same direction from the bearing 21. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. Each magnetic head 33 is supported on an extended end of its corresponding suspension 30. The arms 27 and suspensions 30 constitute a head suspension, and the head suspension and magnetic heads 33 constitute a head suspension assembly.

As shown in FIG. 2, each magnetic head 33 comprises a substantially cuboid slider 42 and read/write head section 44 on an outflow end (trailing end) of the slider. The magnetic head 33 is secured to a gimbal spring 41 on the distal end portion of the suspension 30. A head load L directed to the surface of the magnetic disk 12 is applied to each magnetic head 33 by the elasticity of the suspension 30. The two arms 27 are arranged parallel to and spaced apart from each other, and the suspensions 30 and magnetic heads 33 mounted on these arms face one another with the magnetic disk 12 between them.

Each magnetic head 33 is electrically connected to a main flexible printed circuit board (main FPC, described later) 38 through the suspension 30 and a relay FPC 35 on the arm 27.

Each suspension 30, gimbal spring 41, magnetic head 33, and arm 27 constitute a head gimbal assembly. The head gimbal assembly may not comprise the arm 27. As shown in FIG. 1, the board unit 17 comprises an FPC main body 36 formed of a flexible printed circuit board and the main FPC 38 extending from the FPC main body. The FPC main body 36 is secured to the bottom surface of the base 10a. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 21 in the direction opposite to the arms 27 and a voice coil supported on the support frame. When the head actuator 14 is assembled to the base 10a, the voice coil is located between a pair of yokes 34 that are secured to the base 10a. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the magnetic disk 12. As this is done, the head 33 is moved radially relative to the disk 12 between the inner and outer peripheral edges of the disk.

The following is a detailed description of the configurations of the magnetic disk 12 and each magnetic head 33. FIG. 3 is an enlarged sectional view showing the disk 12 and the head section 44 of the head 33. As shown in FIGS. 1 to 3, the disk 12 comprises a substrate 101 formed of a nonmagnetic disk with a diameter of, for example, about 2.5 inches (about 63.5 mm). A soft magnetic layer 102 for use as an underlayer is formed on each surface of the substrate 101. The soft magnetic layer 102 is overlain by a magnetic recording layer 103, which has a magnetic anisotropy perpendicular to the disk surface. Further, a protective film layer 104 is formed on the recording layer 103.

As shown in FIGS. 2 and 3, each magnetic head 33 is constructed as a flying head, which comprises the substantially cuboid slider 42 and head section 44 formed on the outflow or trailing end of the slider. The slider 42 is formed of, for example, a sintered body (AlTic) containing alumina and titanium carbide, and the head section 44 is formed by laminating thin films.

The slider 42 has a rectangular disk-facing surface or air-bearing surface (ABS) 43 configured to face a surface of the magnetic disk 12. The slider 42 is caused to fly by airflow C that is produced between the disk surface and the ABS 43 as the disk 12 rotates. The direction of the airflow C is coincident with the direction of rotation B of the disk 12. The slider 42 is located above the surface of the disk 12 in such a manner that the longitudinal direction of the ABS 43 is substantially coincident with the direction of the airflow C.

The slider 42 comprises leading and trailing ends 42a and 42b on the inflow and outflow sides, respectively, of the airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and magnetic recording head 58 formed on the trailing end 42b of the slider 42 by thin-film processing. A protective insulating film 76 entirely covers the reproduction and recording heads 54 and 58 except for those parts thereof which are exposed in the ABS 43 of the slider 42. The insulating film 76 forms the external shape of the head section 44.

The reproduction head 54 comprises a magnetic film 55 having a magnetoresistive effect and shielding films 56 and 57 disposed on the trailing and leading sides, respectively, of the magnetic film such that they sandwich the magnetic film between them. The respective lower ends of the magnetic film 55 and shielding films 56 and 57 are exposed in the ABS 43 of the slider 42.

Figure 4:
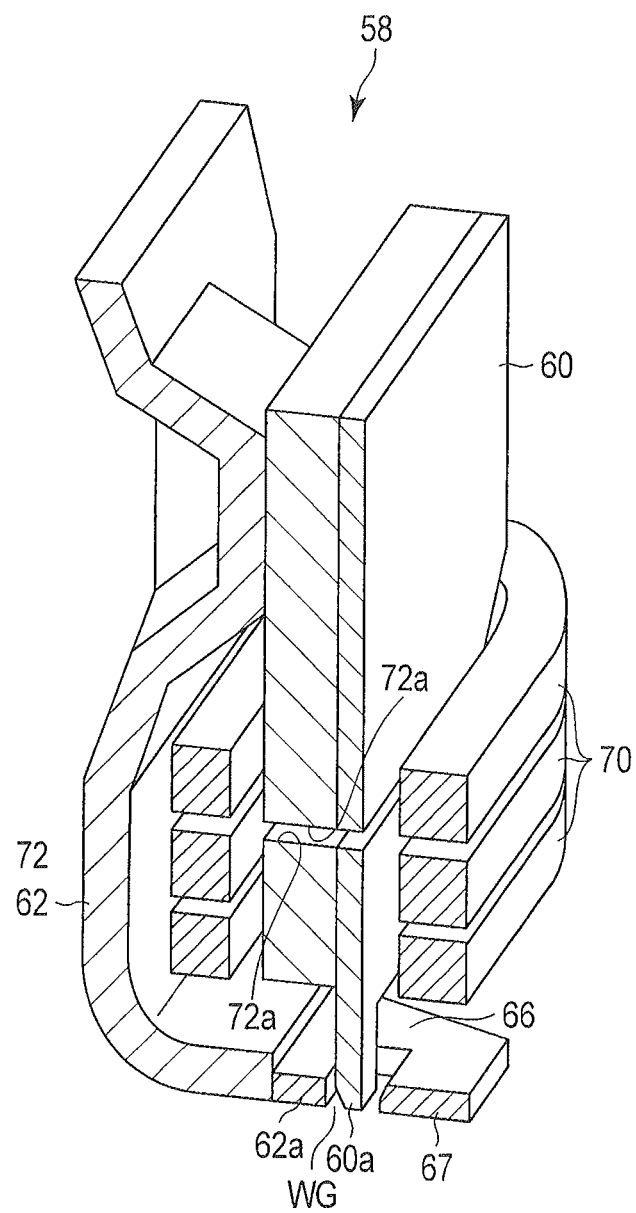
FIG. 4 is a perspective view schematically showing a magnetic recording head of the magnetic head.

The magnetic recording head 58 is located nearer to the trailing end 42b of the slider 42 than the reproduction head 54. FIG. 4 is a perspective view schematically showing the recording head 58.

As shown in FIGS. 3 and 4, the magnetic recording head 58 comprises a main pole 60 of a high-saturation-magnetization material, trailing shield (or return pole) 62, and recording coil 70. The main pole 60 produces a recording magnetic field perpendicular to the surfaces of the magnetic disk 12. The trailing shield 62 is located on the trailing side of the main pole 60 and serves to efficiently close a magnetic path through the soft magnetic layer 102 of the disk 12 just below the main pole. The recording coil 70 is located so that it is wound around a magnetic core (magnetic circuit) including the main pole 60 and trailing shield 62 to establish magnetic flux with respect to the main pole while a signal is being recorded on the disk 12.

The main pole 60 extends substantially perpendicular to the ABS 43 and the surfaces of the magnetic disk 12. A distal end portion 60a of the main pole 60 on the disk side is tapered toward the disk surface. The distal end (or lower end) of the main pole 60 is exposed in the ABS 43 of the slider 42.

The trailing shield 62 of a soft magnetic material is substantially U-shaped and comprises a distal end portion 62a opposed to the distal end portion 60a of the main pole 60 and a junction 50 connected to the main pole 60. The junction 50 is connected to an upper part of the main pole 60, that is, in a position remote from the ABS 43.

The distal end portion 62a of the trailing shield 62 has an elongated rectangular shape. The distal end surface of the trailing shield 62 is exposed in the ABS 43 of the slider 42. A leading end surface of the distal end portion 62a extends transversely relative to the tracks of the magnetic disk 12. In the ABS 43, this leading end surface is opposed substantially parallel to the distal end portion 60a of the main pole 60 with a write gap (magnetic gap portion) WG therebetween. The write gap WG is filled with a nonmagnetic material, for example, the protective insulating film 76, which will be described later.

A side shield 66 and leading shield 67 are disposed individually on the opposite sides and leading side of the main pole 60. The side shield 66 and leading shield 67 are formed integrally with the trailing shield 62 and are magnetically isolated from the main pole 60 in the ABS 43.

The magnetic core (magnetic circuit) including the main pole 60 and trailing shield 62 connected to each other comprises at least one magnetic gap portion recessed inwardly relative to the ABS 43 and is divided by this gap portion. In the present embodiment, a magnetic gap portion 72 is formed in the middle portion of the main pole 60 with respect to its' height such that it vertically divides the main pole 60. The magnetic gap portion 72 is filled with a nonmagnetic material, that is, the protective insulating film 76 in this case. The width or distance of the gap portion 72 is adjusted to, for example, several tens of nanometers.

Further, nonmagnetic material inlet surfaces that face each other with the magnetic gap portion 72 therebetween at a divided portion of the main pole 60, that is, a pair of facing surfaces 72a that define the magnetic gap portion 72, extend substantially parallel to the ABS 43.

The recording coil 70 is located corresponding to the position of the magnetic gap portion 72 so that they are wound around the main pole 60. Thus, the magnetic gap portion 72 is located in the center of the recording coil 70 and surrounded by the coil 70. The pair of facing surfaces 72a are located substantially parallel to the winding plane of the recording coil 70, that is, to a plane perpendicular to the winding center axis of the coil 70.

The recording coil 70 is connected to a power supply through a terminal (not shown). A current supplied from the power supply to the recording coil 70 is controlled by the control unit 25 of the HDD. In recording a signal on the magnetic disk 12, a predetermined current is supplied from the power supply to the recording coil 70, whereby magnetic flux is established with respect to the main pole 60 to produce a magnetic field.

When the VCM 16 is activated, according to the HDD constructed in this manner, the head actuator 14 pivots, whereupon each magnetic head 33 is moved to and positioned on a desired track of the magnetic disk 12. Further, the magnetic head 33 is caused to fly by the airflow C that is produced between the disk surface and the ABS 43 as the magnetic disk 12 rotates. When the HOD is operating, the ABS 43 of the slider 42 is opposed to the disk surface with a gap therebetween. As shown in FIG. 2, the magnetic head 33 flies in an inclined posture such that the recording head 58 of the head section 44 is located closest to the surface of the disk 12. In this state, the reproduction head 54 reads recorded data from the disk 12, while the recording head 58 writes data to the disk.

In writing data, as shown in FIG. 3, an alternating current from the power supply is passed through the recording coil 70, whereupon the main pole 60 is excited by the coil 70. As magnetization in the main pole 60 moves vertically relative to the surface of the magnetic disk 12 and propagates up to the trailing shield 62, the magnetic field leaks from the write gap WG, and a recording magnetic field is applied to the directly underlying recording layer 103 of the magnetic disk 12. In this way, data is recorded on the recording layer 103 with a desired track width.

According to the present embodiment, as described above, the magnetic gap portion 72 is disposed in a part of the magnetic core, that is, a part of the main pole 60 in this case, and the recording coil 70 is disposed around the magnetic gap portion 72. Thus, the response of magnetization in the main pole 60 and trailing shield 62 can be improved without degrading the value of low-frequency saturation magnetization in the magnetic core. Therefore, the current rise characteristic of the leakage magnetic field from the write gap WG can be improved even in the case of high-frequency writing or recording. Thus, recording at a high transfer rate can be performed, so that densification of the HDD can be achieved.

FIG. 5 comparatively shows generated magnetic field strengths (Heff) of the magnetic recording head according to the present embodiment and a magnetic recording head according to a comparative example obtained as the current to be passed through the recording coil is increased. The magnetic recording head according to the comparative example is designed so that its magnetic core does not comprise a magnetic gap portion other than a write gap.

For the magnetic recording head according to the comparative example, the current rise characteristic of the leakage magnetic field from the write gap obtained when a low frequency is recorded is represented by open triangles (Δ), while that obtained when a high-frequency signal is recorded is represented by solid diamonds (◆). If recording is performed at a high frequency, the current rise characteristic is degraded, that is, the generated magnetic field strength Heff is reduced, thus indicating degradation of the magnetization response of the magnetic core. If the magnetic recording head of the present embodiment is used for high-frequency recording, in contrast, the current rise characteristic of the leakage magnetic field from the write gap is improved, as indicated by solid squares (■) in FIG. 5. Specifically, it is indicated that a current rise characteristic or magnetic field strength substantially equivalent to that for low-frequency recording can be achieved. This implies that the response of magnetization in the main pole 60 and trailing shield 62 is improved in the magnetic recording head according to the present embodiment.

According to the HDD and magnetic recording head of the present embodiment, as described above, the response of magnetization in the magnetic pole is enhanced so that the current rise characteristic is improved when a high-frequency signal is recorded, thereby enabling high-transfer-rate recording. Thus, there can be obtained an HDD with higher linear recording density capable of high-density recording.

The following is a description of HDDs according to alternative embodiments. In the description of these alternative embodiments to follow, like reference numbers are used to designate the same parts as those of the first embodiment, and a detailed description thereof is omitted. The following is a detailed description focused on different parts.

Second Embodiment

Figure 6:
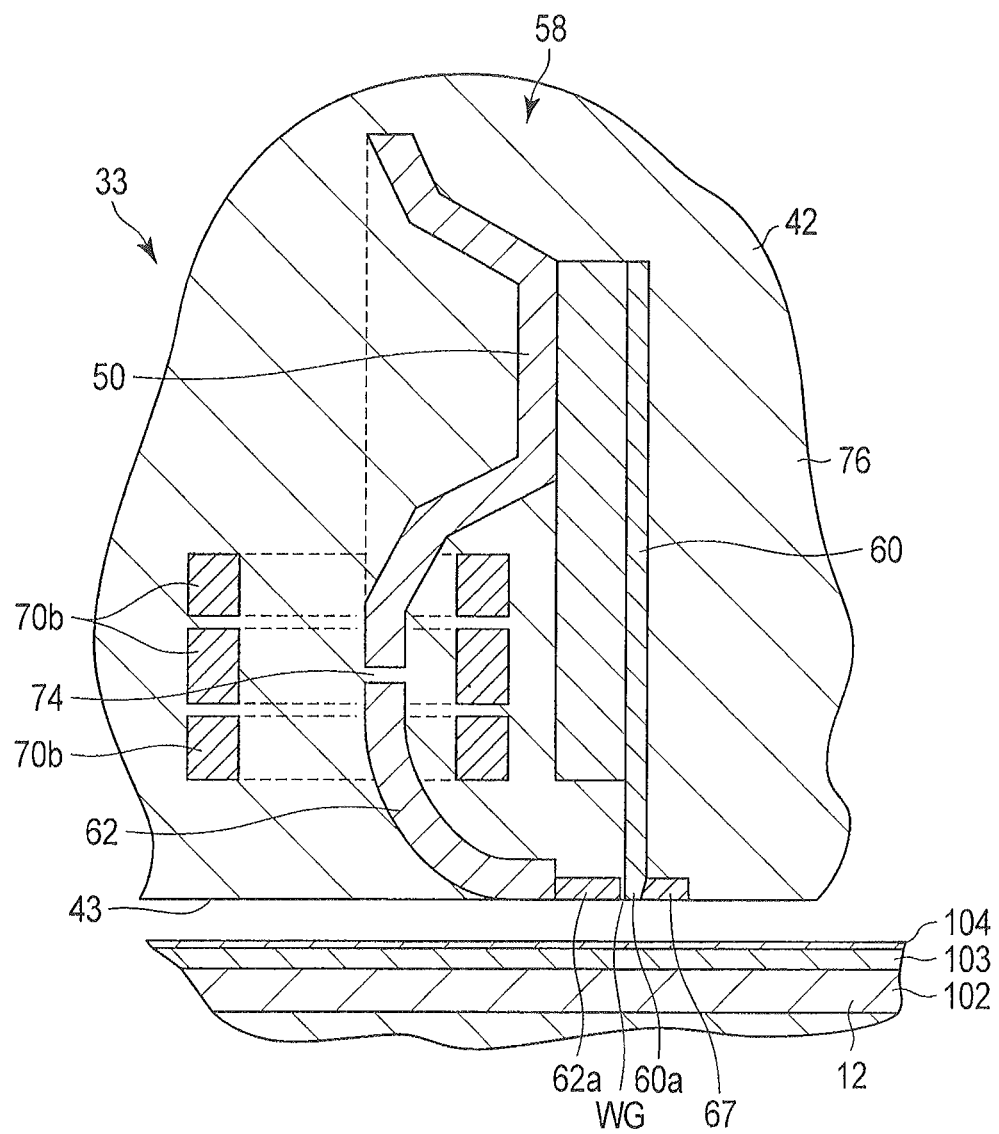
FIG. 6 is an enlarged sectional view showing a magnetic recording head of an HDD according to a second embodiment.

FIG. 6 is an enlarged sectional view showing a magnetic recording head of a magnetic head in an HDD according to a second embodiment. According to the present embodiment, a magnetic recording head 58 comprises a main pole 60 of a high-saturation-magnetization material, trailing shield (or return pole) 62, and recording coil 70b. The trailing shield 62 is located on the trailing side of the main pole 60 and serves to efficiently close a magnetic path through a soft magnetic layer 102 just below the main pole. Recording coil 70b is located so that it is wound around a magnetic core (magnetic circuit) including the main pole 60 and trailing shield 62 to establish magnetic flux with respect to the main pole while a signal is being recorded on a magnetic disk 12.

According to the present embodiment, the main pole 60 extends substantially perpendicular to an ABS 43 and the surfaces of the magnetic disk 12 without being divided. A distal end portion 60a of the main pole 60 on the disk side is tapered toward the disk surface.

The trailing shield 62 of a soft magnetic material is located on the trailing side of the main pole 60 and comprises a distal end portion 62a opposed to the distal end portion 60a of the main pole 60 with a write gap WG therebetween and a junction 50 connected to the main pole 60 in a position remote from the ABS 43.

In the magnetic core, according to the second embodiment, the trailing shield 62 is divided in the middle. Specifically, the trailing shield 62 is divided in a position between its distal end portion 62a and junction 50, and a magnetic gap portion 74 is defined in the area of division such that it is filled with a nonmagnetic material, for example, a protective insulating film 76. The width or distance of the gap portion 74 is adjusted to, for example, several tens of nanometers.

Recording coil 70b is located corresponding to the position of the magnetic gap portion 74 so that it is wound around the trailing shield 62. Thus, the gap portion 74 is located in the center of recording coil 70b and surrounded by the coil 70b. Recording coil 70b is connected to a power supply through a terminal (not shown). A current supplied from the power supply to the recording coil 70 is controlled by a control unit 25 of the HDD. In recording a signal on the magnetic disk 12, a predetermined current is supplied from the power supply to recording coil 70b, whereby magnetic flux is established with respect to the main pole 60 to produce a magnetic field.

The other parts of the magnetic recording head 58 of the second embodiment are constructed in the same manner as those of the first embodiment. Also in the second embodiment, the response of magnetization in the magnetic pole is enhanced so that the current rise characteristic is improved when a high-frequency signal is recorded, thereby enabling high-transfer-rate recording. Thus, there can be obtained a magnetic recording head and an HDD with higher linear recording density capable of high-density recording.

Third Embodiment

Figure 7:
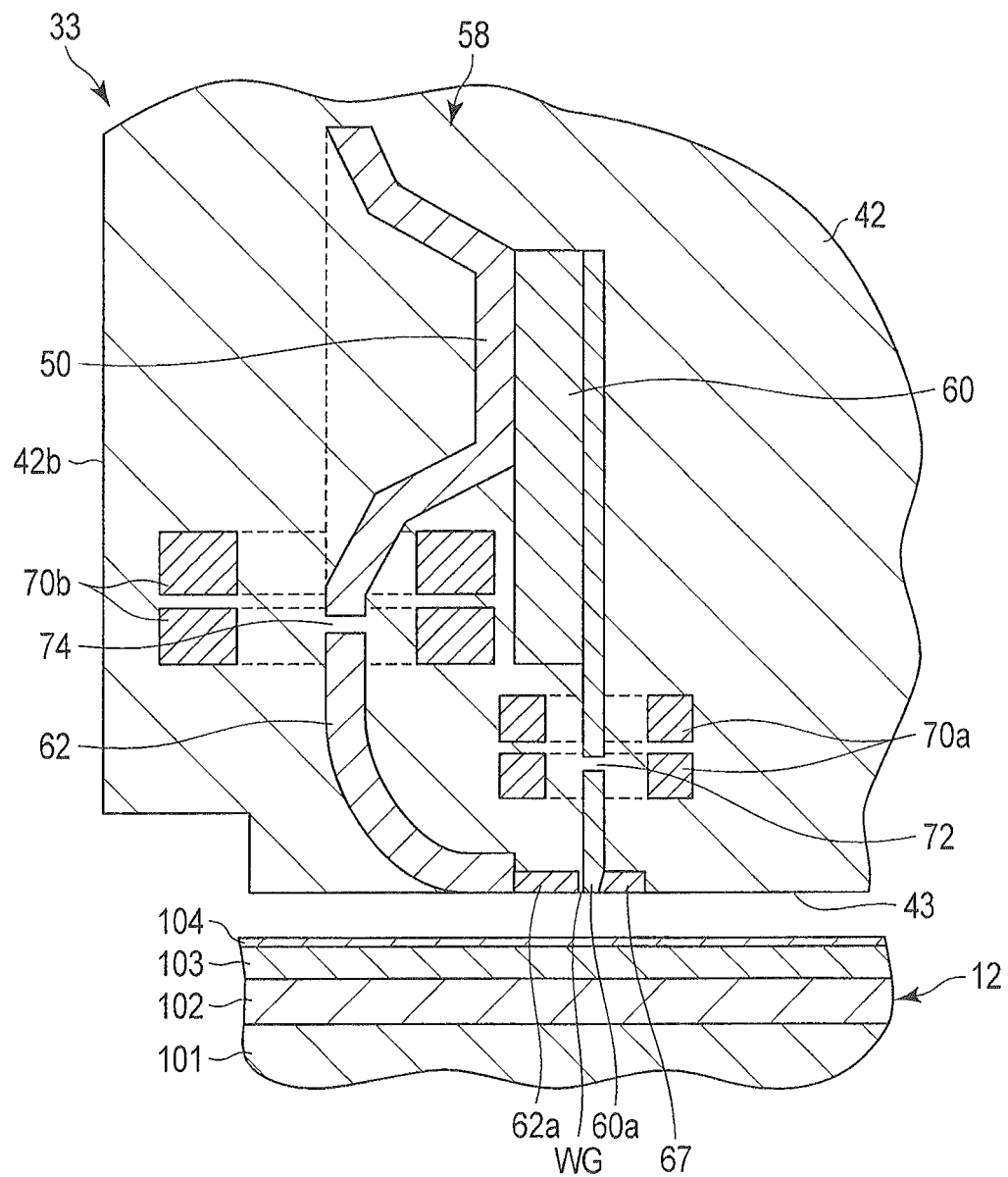
FIG. 7 is an enlarged sectional view showing a magnetic recording head of an HDD according to a third embodiment.

FIG. 7 is an enlarged sectional view showing a magnetic recording head of a magnetic head in an HDD according to a third embodiment. According to the present embodiment, a magnetic recording head 58 comprises a main pole 60 and trailing shield 62, which constitute a magnetic core, and two recording coils 70a and 70b located so that they are individually wound around the magnetic core.

According to the third embodiment, the main pole 60 and trailing shield 62 comprise magnetic gap portions 72 and 74, respectively, filled with a nonmagnetic material. Recording coil 70a is located in a position corresponding to the magnetic gap portion 72 such that it is wound around the main pole 60. Specifically, the gap portion 72 is located in the center of recording coil 70a and surrounded by the coil 70a.

Further, recording coil 70b is located corresponding to the position of the magnetic gap portion 74 so that it is wound around the trailing shield 62. Thus, the gap portion 74 is located in the center of recording coil 70b and surrounded by the coil 70b. Recording coils 70a and 70b are connected to a power supply through a terminal (not shown). In recording a signal on a magnetic disk 12, a predetermined current is supplied from the power supply to recording coils 70a and 70b, whereby magnetic flux is established with respect to the main pole 60 to produce a magnetic field.

The other parts of the magnetic recording head 58 of the third embodiment are constructed in the same manner as those of the first and second embodiments.

Also in the third embodiment arranged in the above-described manner, the response of magnetization in the magnetic pole is enhanced so that the current rise characteristic is improved when a high-frequency signal is recorded, thereby enabling high-transfer-rate recording. Thus, there can be obtained a magnetic recording head and an HDD with higher linear recording density capable of high-density recording.

Fourth Embodiment

Figure 8:
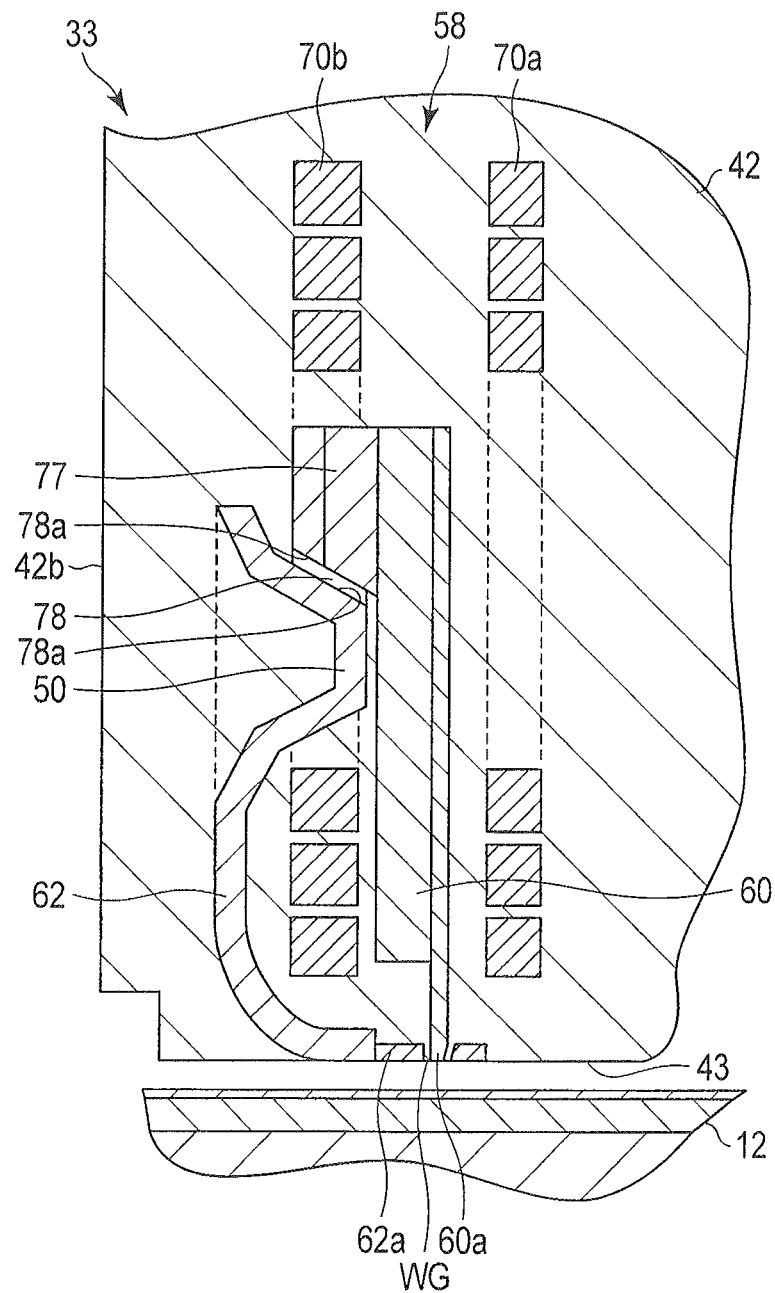
FIG. 8 is an enlarged sectional view showing a magnetic recording head of an HDD according to a fourth embodiment.

FIG. 8 is an enlarged sectional view showing a magnetic recording head of a magnetic head in an HDD according to a fourth embodiment. According to the present embodiment, a magnetic recording head 58 comprises a main pole 60 and trailing shield 62, which constitute a magnetic core, and two recording coils 70a and 70b located so that they are individually wound around the magnetic core.

The main pole 60 comprises a magnetic pole portion 77 projecting from its upper end portion (remote from an ABS 43) toward the trailing shield 62. The trailing shield 62 comprises a junction 50 opposed to the main pole 60 and magnetic pole portion 77 with a gap therebetween in a position remote from the ABS 43. The magnetic core is divided in a position between the magnetic pole portion 77 and the junction 50 of the trailing shield 62, and a nonmagnetic material that fills the gap forms a magnetic gap portion 78. The width or distance of the gap portion 78 is adjusted to, for example, 200 to 500 nm.

Recording coil 70b for recording current input is disposed so that it is turned around the magnetic gap portion 78. In the present embodiment, recording coil 70b is wound around the trailing shield 62 and the magnetic pole portion 77 of the main pole in a position around the magnetic gap portion 78, in such a manner that its central axis extends substantially parallel to the ABS 43. A part of recording coil 70b is located between the trailing shield 62 and main pole 60.

In the area of division between the junction 50 and magnetic pole portion 77, nonmagnetic material inlet surfaces that face each other with the magnetic gap portion 78 therebetween, that is, a pair of facing surfaces 78a that define the magnetic gap portion 78, extend not parallel to the winding plane of recording coil 70b. The pair of facing surfaces 78a are located at an angle of 45° or more to the winding plane of recording coil 70b, that is, to a plane perpendicular to the winding center axis of the coil 70b.

Further, the other recording coil 70a is disposed on the leading side of the main pole 60. This recording coil 70a is wound substantially coaxially with recording coil 70b.

The other parts of the magnetic recording head 58 of the fourth embodiment are constructed in the same manner as those of the first and second embodiments. Also in the fourth embodiment arranged in the above-described manner, the response of magnetization in the magnetic pole is enhanced so that the current rise characteristic is improved when a high-frequency signal is recorded, thereby enabling high-transfer-rate recording. Thus, there can be obtained a magnetic recording head and an HDD with higher linear recording density capable of high-density recording.

Fifth Embodiment

Figure 9:
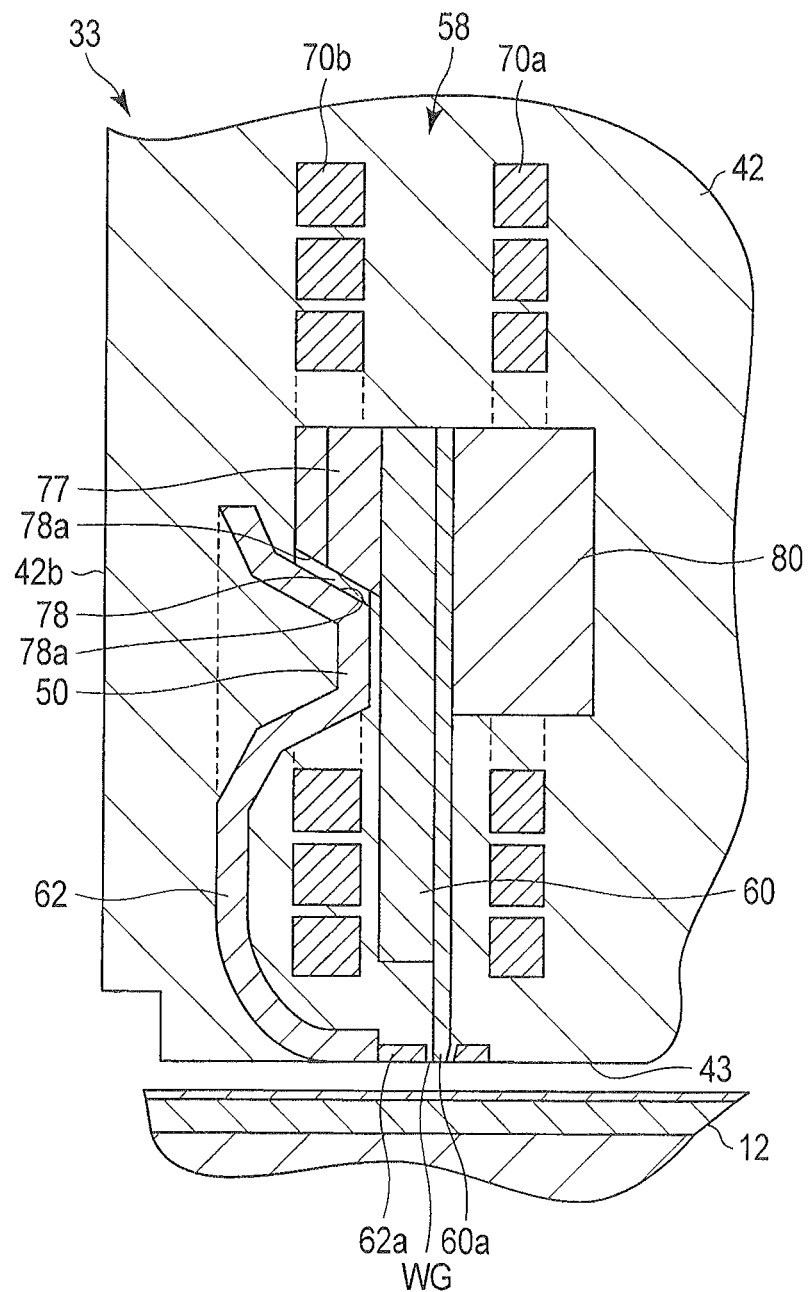
FIG. 9 is an enlarged sectional view showing a magnetic recording head of an HDD according to a fifth embodiment.

FIG. 9 is an enlarged sectional view showing a magnetic recording head of a magnetic head in an HDD according to a fifth embodiment. According to the present embodiment, a magnetic recording head 58 is constructed in substantially the same manner as that of the fourth embodiment and further comprises a magnetic pole portion 80 projecting from its upper end portion to the leading side opposite to a trailing shield 62. The magnetic pole portion 80 is located in the center of a recording coil 70*a*. Specifically, recording coil 70*a* is wound around the magnetic pole portion 80.

The other parts of the magnetic recording head 58 of the fifth embodiment are constructed in the same manner as those of the fourth embodiment. Also in the fifth embodiment arranged in the above-described manner, the response of magnetization in the magnetic pole is enhanced so that the current rise characteristic is improved when a high-frequency signal is recorded, thereby enabling high-transfer-rate recording. Thus, there can be obtained a magnetic recording head and an HDD with higher linear recording density capable of high-density recording. Further, the magnetic pole portion 80 in the center of recording coil 70*a* can increase the generated magnetic field strength of the main pole 60.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the numbers of magnetic disks and heads can be increased as required, and the disk size can be variously selected. Further, a high-frequency oscillator, such as a spin-torque oscillator, may be disposed in the write gap between the main pole and trailing shield.

What is claimed is:

1. A magnetic recording head in a magnetic disk drive, which comprises a double-layered perpendicular medium comprising a perpendicular recording layer, having a magnetic anisotropy perpendicular to a surface of a disk, and a soft magnetic layer with soft magnetic properties lying below the recording layer, the magnetic recording head comprising:
a magnetic core comprising a plurality of magnetic poles which form a closed magnetic path; and
a recording coil wound around a part of the magnetic core and configured to produce a magnetic field to the magnetic core, wherein
the magnetic core comprises a write gap formed of a nonmagnetic material in a disk-facing surface of the recording head, a magnetic gap portion located a position off from the disk-facing surface and magnetically isolated, and a nonmagnetic material in the magnetic gap portion, the recording coil is wound around the nonmagnetic material in the magnetic gap portion.

2. The magnetic recording head of claim 1, wherein the magnetic core comprises a main pole and a return pole opposed to the main pole with the write gap therebetween in the disk-facing surface, the return pole comprising a junction portion opposed to the main pole in a position off the disk-facing surface, and the magnetic gap portion is defined between the junction portion and the main pole.

3. The magnetic recording head of claim 2, wherein a winding plane of the recording coil perpendicular to a winding center axis of the recording coil is not parallel to a nonmagnetic material inlet surface of the magnetic gap portion.

4. The magnetic recording head of claim 3, wherein an angle formed between the winding plane of the recording coil and the nonmagnetic material inlet surface of the magnetic gap portion is 45° or more.

5. The magnetic recording head of claim 1, wherein the magnetic core comprises a main pole and a return pole opposed to the main pole with the write gap therebetween in the disk-facing surface, the return pole comprises the magnetic gap portion.

6. The magnetic recording head of claim 5, wherein the return pole comprises a junction portion connected to the main pole in a position off the disk-facing surface, and the magnetic gap portion is provided at the return pole in a position between the junction portion and the write gap.

7. The magnetic recording head of claim 1, wherein a width of the magnetic gap portion ranges from several tens of nanometers to 500 nm.

8. The magnetic recording head of claim 2, wherein a width of the magnetic gap portion ranges from several tens of nanometers to 500 nm.

9. The magnetic recording head of claim 5, wherein a width of the magnetic gap portion ranges from several tens of nanometers to 500 nm.

10. The magnetic recording head of claim 1, wherein the magnetic core comprises a main pole and a return pole opposed to the main pole with the write gap therebetween in the disk-facing surface, the main pole comprises the magnetic gap portion.

11. A head gimbal assembly comprising:
the magnetic recording head of claim 1; and
a suspension configured to support the magnetic recording head by a gimbal.

12. The head gimbal assembly of claim 11, wherein the magnetic core comprises a main pole and a return pole opposed to the main pole with the write gap therebetween in the disk-facing surface, the return pole comprising a junction portion opposed to the main pole in a position off the disk-facing surface, and the magnetic gap portion is defined between the junction portion and the main pole.

13. The head gimbal assembly of claim 11, wherein the magnetic core comprises a main pole and a return pole opposed to the main pole with the write gap therebetween in the disk-facing surface, the return pole comprises the magnetic gap portion.

14. The head gimbal assembly of claim 11, wherein a width of the magnetic gap portion ranges from several tens of nanometers to 500 nm.

15. The head gimbal assembly of claim 11, wherein the magnetic core comprises a main pole and a return pole opposed to the main pole with the write gap therebetween in the disk-facing surface, the main pole comprising the magnetic gap portion.

16. A disk drive comprising:
   a disk recording medium comprising a recording layer;
   a drive module configured to rotate the recording medium; and
   the magnetic recording head of claim 1 configured to perform data processing on the recording medium.

17. The disk drive of claim 16, wherein the magnetic core comprises a main pole and a return pole opposed to the main pole with the write gap therebetween in the disk-facing surface, the return pole comprising a junction portion opposed to the main pole in a position off the disk-facing surface, and the magnetic gap portion is defined between the junction portion and the main pole.

18. The disk drive of claim 16, wherein the magnetic core comprises a main pole and a return pole opposed to the main pole with the write gap therebetween in the disk-facing surface, the return pole comprises the magnetic gap portion.

19. The disk drive of claim 16, wherein a width of the magnetic gap portion ranges from several tens of nanometers to 500 nm.

20. The disk drive of claim 16, wherein the magnetic core comprises a main pole and a return pole opposed to the main pole with the write gap therebetween in the disk-facing surface, the main pole comprising the magnetic gap portion.

* * * * *